(No Model.)

C. H. ROCHE.
NAILLESS HORSESHOE.

No. 549,536. Patented Nov. 12, 1895.

Witnesses
Edwin G. McKee
Louis G. Randall

Charles H. Roche
Inventor
By
John Wedderburn
Attorney

UNITED STATES PATENT OFFICE.

CHARLES H. ROCHE, OF GRAND JUNCTION, ASSIGNOR OF ONE-THIRD TO HENRY OBENDORFER, OF RICO, COLORADO.

NAILLESS HORSESHOE.

SPECIFICATION forming part of Letters Patent No. 549,536, dated November 12, 1895.

Application filed July 8, 1895. Serial No. 555,191. (No model.)

*To all whom it may concern:*

Be it known that I, CHARLES H. ROCHE, a citizen of the United States, residing at Grand Junction, in the county of Mesa and State of Colorado, have invented certain new and useful Improvements in Nailless Horseshoes; and I do hereby declare the following to be a full, clear, and exact description of the invention, such as will enable others skilled in the art to which it appertains to make and use the same.

My invention relates to improvements in nailless horseshoes, having for its object to provide a horseshoe which may be readily applied to and removed from the hoof of a horse, thereby preserving the hoof and preventing its breaking and cracking and also saving the expense incident upon having a regular horseshoer apply the shoes in the old manner.

The invention consists of a shoe of the same general contour as the ordinary shoe, having a series of projections on its upper face for the purpose of preventing slipping and provided with a pair of straps welded to the shoe at points near the rear end or heel thereof, said straps being supported by metallic braces welded to the shoe near the toe, one of said straps having a tooth or projection on its upper face and the other provided with a series of perforations which are adapted to be fitted over said tooth or projection for the purpose of securing the two straps together.

The invention is clearly illustrated in the accompanying drawings, in which—

Figure 1:
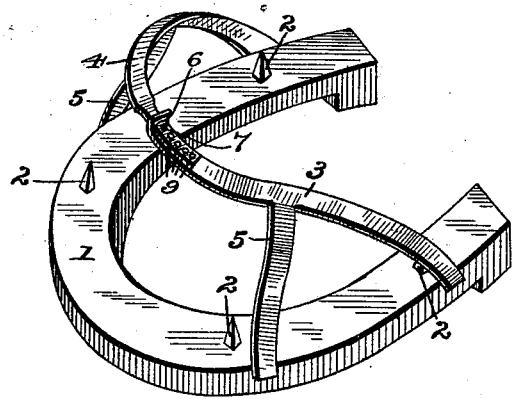
Figure 2:

Figure 1 is a perspective view of my device complete, and Fig. 2 is a detail view showing the ends of the two straps slightly separated one from the other.

Like reference-numerals indicate like parts in the two views.

1 represents the shoe proper, which is of the usual shape, except that no holes are provided for the passage of securing-nails therethrough. On the upper surface of the shoe 1 are a series of projections 2, and welded to the shoe at points near the rear ends thereof are a pair of metallic straps 3 4, which are further supported by a pair of metallic braces 5 5, welded or otherwise secured to the forward part of the shoe 1. The strap 3 is slotted or looped, as shown at 6, near its outer end and is formed with a projection or tooth 7 on its upper surface and with a series of recesses 8 adjacent thereto. The strap 4 has a series of perforations 9 9 therein, as clearly shown.

In applying my shoe to the hoof of a horse the same is placed against the under side thereof, the projections 2 being forced into the hoof for the purpose of preventing slipping. The straps 3 and 4 pass around the upper portion of the hoof and are secured in place by passing the strap 4 through the slot 6 in the strap 3, one of the slots 9 fitting over the tooth or projection 7, thereby securely holding the two parts together. The recesses or indentations 8 are provided for the purpose of forming a fulcrum against which a horseshoe-nail or other pointed instrument may be forced after being passed through one of the perforations 9 in the strap 4.

It will thus be seen that I provide a shoe that can be readily placed in position and secured upon the hoof of a horse without the employment of nails or skilled labor, and one that is adjustable to accommodate it to hoofs of varying shapes and sizes.

Having now described my invention, what I claim as new, and desire to secure by Letters Patent, is—

1. The herein described nailless horseshoe, consisting of the combination of a shoe of general form of construction, and a pair of metallic straps welded to the rear end of said shoe, metallic braces connecting the forward ends of said straps and the toe of said shoe, and a clamping device for the meeting ends of said straps, the adjacent ends of said clamping device being passed one through the other substantially as and for the purpose described.

2. The herein described nailless horseshoe, consisting of the combination of a shoe of general form of construction, having a series of pointed projections on its upper face, a pair of metallic straps welded to the rear of said shoe, a pair of metallic braces connecting the forward ends of said straps and the toe of said shoe, one of said straps being formed with a loop or slot at its forward end, and a tooth or projection on its upper surface, and a series of recesses adjacent thereto and the other of said straps passed through said loop and having a series of perforations in its outer end, substantially as and for the purpose described.

In testimony whereof I have signed this specification in the presence of two subscribing witnesses.

CHARLES H. ROCHE.

Witnesses:
R. G. MURPHY,
JOHN S. O'ROURKE.